United States Patent [19]

Guttman

[11] 4,364,827
[45] Dec. 21, 1982

[54] HYDRAULIC FILTER PLATE SHIFTER

[75] Inventor: Murray M. Guttman, Saddle Brook, N.J.

[73] Assignee: Envirotech Corporation, Menlo Park, Calif.

[21] Appl. No.: 107,213

[22] Filed: Dec. 28, 1979

Related U.S. Application Data

[63] Continuation of Ser. No. 940,916, Sep. 11, 1978, abandoned, which is a continuation of Ser. No. 815,616, Jul. 13, 1977, abandoned.

[51] Int. Cl.³ .............................................. B01D 25/14
[52] U.S. Cl. ...................................... 210/225; 91/459; 210/230
[58] Field of Search .................. 91/61, 189 R, 411 R; 210/224–231

[56] References Cited

U.S. PATENT DOCUMENTS

| 2,912,827 | 11/1959 | Thomas | 91/189 R |
|---|---|---|---|
| 3,295,437 | 1/1967 | Fowler | 210/230 X |
| 3,306,455 | 2/1967 | Moziek | 210/230 |
| 3,583,282 | 6/1971 | Cope | 91/189 R X |
| 3,598,240 | 8/1971 | Abe et al. | 210/230 |
| 3,990,520 | 11/1976 | Koch et al. | 91/189 R X |
| 4,024,797 | 5/1977 | Johnson | 91/411 R X |

FOREIGN PATENT DOCUMENTS

| 2001193 | 12/1970 | Fed. Rep. of Germany | 210/230 |
|---|---|---|---|
| 60285 | 2/1968 | German Democratic Rep. | 210/231 |
| 920379 | 3/1963 | United Kingdom | 210/230 |
| 934772 | 8/1963 | United Kingdom | 210/230 |

Primary Examiner—Robert H. Spitzer
Attorney, Agent, or Firm—R. E. Krebs

[57] ABSTRACT

A device for moving filter plates from one end of a filter press to the other end, includes carriages which selectively couple to each of the plates and which are driven to slide along the frame members of the press by a hydraulic motor. A control means is provided to control the operation of the hydraulic motor.

2 Claims, 2 Drawing Figures

HYDRAULIC FILTER PLATE SHIFTER

This is a continuation of application Ser. No. 940,916, filed Sept. 11, 1978, which is a continuation of application Ser. No. 815,616, filed July 13, 1977, both now abandoned.

BACKGROUND OF THE INVENTION

1. Field of the Invention

The present invention generally relates to a device for filtering solids from a slurry of liquid and solids.

2. State of the Art

It is known to use a filter press to filter solids from a slurry of liquid and solids. A conventional filter press includes a plurality of filter plates which have filter media affixed thereto. The filter plates are slidably disposed on horizontal rails supported between the head end and the ram end of the press. The filter press further includes a hydraulic closing device to force the plates into abutting relationship with each other to form a stack near the head end of the press. The hydraulic closing device includes a follower which is movably disposed on the horizontal rails and connected to a hydraulic ram piston. The ram piston is slidably disposed in a hydraulic cylinder, and the hydraulic cylinder is connected to a pump to pump hydraulic fluid into the cylinder. Hydraulic fluid pumped into the hydraulic cylinder urges the follower against the stack of filter plates to hold the plates in abutting relationship with each other.

When slurry is pumped into the filter press and through the filter media on the plates, solids collect on the media, and filtered liquid flows through the media and from the press. When substantial quantities of solids have collected on the media, the solids must be removed and disposed of. To permit removal of solids from the media, the follower is moved away from the plates to the ram end of the press thereby creating a space between the plates and the follower. Each plate is then transported along the rails from the stack of filter plates to the follower end of the press while solids are dislodged from the media by conventional means.

A commonly employed means to transport the plates along the rails includes carriages connected to chains which slide along the rails. The carriages selectively couple to and uncouple from each filter plate.

Thus it can be seen that in operation the carriages couple to the first plate in the stack, and are driven by the chains to transport the plate to the follower end of the press to deposit it there. The carriages then return to the stack to couple to the next plate, and so forth.

Is is known to employ means to control the travel of the carriages along the rails. For example, British Pat. No. 934,772 teaches an electrically operated control system to control the flow of hydraulic fluid to a hydraulic cylinder. A hydraulic ram is reciprocatably disposed within the hydraulic cylinder, and the hydraulic ram is connected to gears which are in turn connected to chains to which the carriages are affixed. The electrically operated control system controls the flow of a stream of hydraulic fluid to the hydraulic cylinder to drive the ram. As the ram reciprocates within the cylinder, the gears are driven to move the carriages along the rails. When the carriages have carried a filter plate to the follower end of the press, the control system reverses the direction of travel of the ram thereby causing the carriage to travel back along the rails to couple to the next plate.

It should be understood that many liquids processed in a filter press generate explosive fumes. Electrical control systems such as the patented system identified above, generally can produce sparks which can ignite the explosive fumes. In a filter press which is used to filter liquids which generate explosive fumes, it is undesirable to utilize an electrically operated system. However, a hydraulically operated system can be used safely.

Conventional filter press shifting devices often include an electric motor which is manually controlled to drive the carriages. Such conventional shifting devices are often modified to operate automatically by the inclusion of an appropriate control system. Modificational of a conventional press to include the patented control system described above requires that a hydraulic cylinder and substantial gear train be substituted for the prior electric motor. On the other hand, applicant's control system includes a simple hydraulic motor which can be substituted for the electric motor.

OBJECTS OF THE INVENTION

An object of the present invention is to provide a hydraulically operated means to control a device which shifts filter plates.

Another object is to provide a hydraulically operated means to shift filter plates which includes a hydraulic motor.

BRIEF DESCRIPTION OF THE DRAWINGS

Further objects and advantages of the present invention may be readily ascertained by reference to the following description and appended drawings, which are offered by way of illustration only and not in limitation of the invention, whose scope is defined by the claims and equivalents.

DETAILED DESCRIPTION OF THE PREFERRED EMBODIMENT

Figure 1:
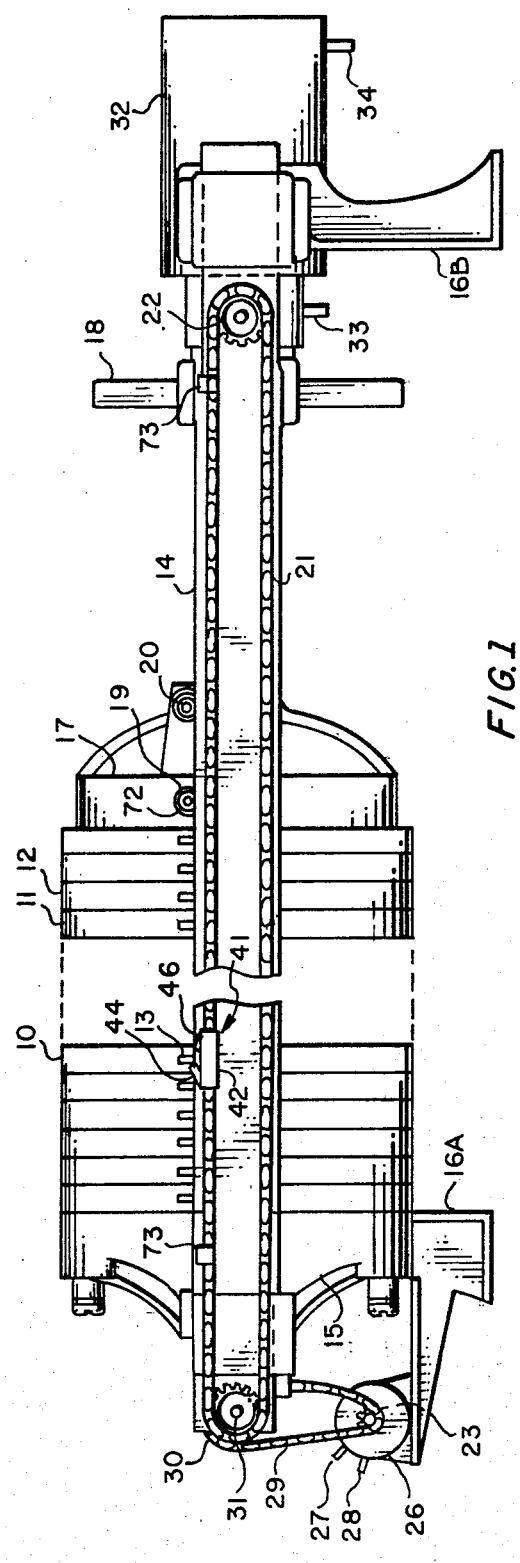
FIG. 1 is a side view of a filter press having a carriage and adapted for use with the present invention.

FIG. 1 illustrates a filter press including a plurality of filter plates 10, 11, 12 etc., each provided with handles 13 on opposite sides thereof which support the plates on two parallel longitudinal frame members 14, one on each side of the press. A filter press head 15 having legs 16a supports the left end of the frame members 14 while their opposite ends are mounted on a support having legs 16b. A follower 17 is movably mounted on the frame members 14 and is provided with rollers 19 and 20 which engage the frame members 14 to enable the follower to be moved toward and away from the press head 15.

Extending along the frame members 14 are endless chains 21, one on each side of the filter press, which are engaged by sprockets 31 at the head end of the filter and by sprockets 22 at the opposite ends of the frame members. A hydraulic motor 26 is mounted on the support 16a to drive a sprocket 23 which, in turn, is coupled by means of a chain 29 to a sprocket 30 which is connected by a shaft to the sprockets 31, on each side of the filter press to drive the endless chains 21. The motor 26 is powered by means of hydraulic fluid pumped through fluid inlets 27 and 28 and is adapted to rotate the sprockets 31 either clockwise or counter-clockwise depending upon which fluid inlet, 27 or 28, receives the hydraulic fluid, as will be discussed hereinafter.

Figure 2:
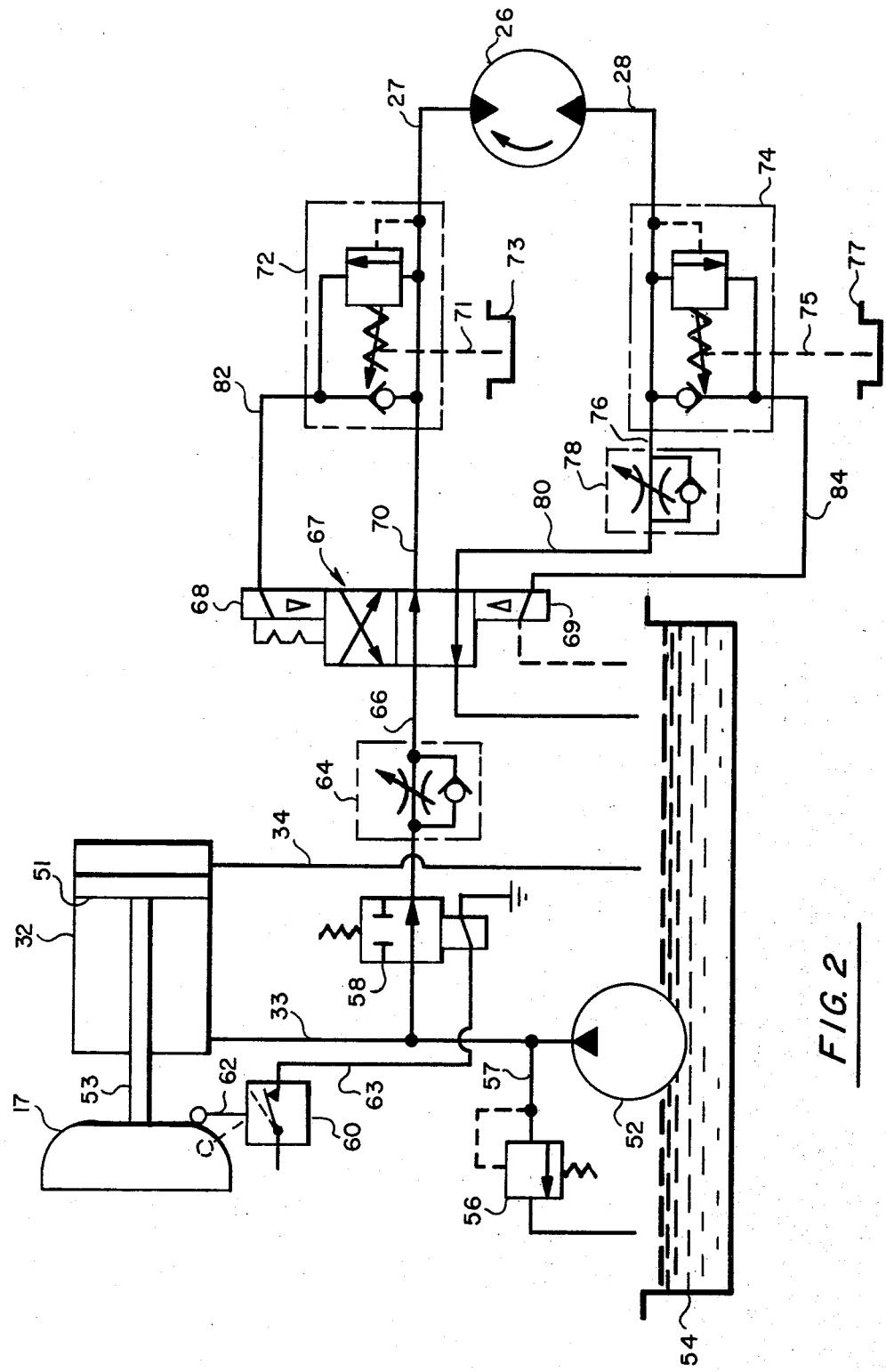
FIG. 2 is a schematic drawing of the present invention.

A hydraulic cylinder 32 is disposed at the follower end of the press and contains, as shown in FIG. 2, a piston 51. The piston is fixedly connected by piston rod 53 to the follower 17 to move it toward or away from the head end of the press. Hydraulic fluid lines 33 and 34 supply hydraulic fluid to the cylinder 32 to reciprocate the piston. When hydraulic fluid is introduced through line 34, the follower is forced against the filter plates, and when hydraulic fluid is introduced through line 33, the follower is driven away from the plates and the hydraulic fluid is drained via line 34. Relief valve 56 is connected to line 33 via line 57.

Conventional carriages 41 are fixedly connected to the chains 21 on opposite sides of the filter press to slide along the top edges of the frame members 14. Suitable carriages 41 are taught, for example, in U.S. Pat. No. 3,306,455 and will only be described generally herein.

The carriages 41 each include a base 42 connected to the chains 21 and pawls 44 and 46 pivotably connected to the base 42. The pawls 44 and 46 can be oriented in either a raised or lowered position; in a raised position, the free end of the pawl extends above the carriage 41 a distance sufficient to contact a handle 13 on a filter plate. However, when the pawl is in its lowered position, its free end will not contact a handle 13 as the carriage 41 travels along the rail 14. In FIG. 1, pawl 44 is shown in the raised position and pawl 46 in the lowered position.

It should be understood that when one pawl is in its raised position and the other pawl is in its lowered position, the carriage 41 will be coupled to the handle of a filter plate in one direction of travel of the carriages. In FIG. 1, for instance, the carriage 41 is shown temporarily coupled to the handle 13 of filter plate 10 so that movement of the carriage 41 toward the follower 17 carries the filter plate 10 toward the follower, but movement of the carriage 41 toward the head 15 will not cause the filter plate 10 to move.

As will now be described in detail, a hydraulically operated system is provided to control the flow of hydraulic fluid to the motor 26 to cause it to rotate clockwise or counter-clockwise to drive the carriages 41. The system, as shown in FIG. 2, includes a conventional hydraulic pumping unit 52 to pump hydraulic fluid from reservoir 54 to the hydraulic cylinder 32 via the aforementioned line 33. An electric limit switch 60 of conventional construction is affixed to the filter press adjacent to the cylinder 32 so that when the follower 17 is near the cylinder 32, as shown in FIG. 2, the follower 17 contacts an actuating arm 62 to close the limit switch 60. The limit switch 60 is spring-biased so that it is normally open. When closed, the limit switch permits electric current to flow from a source of current, not shown, through line 63 to a solenoid operated valve 58. The solenoid operated valve 58 is connected so that when actuated by electric current from the limit switch 60, the valve 58 opens to permit hydraulic fluid to flow from line 33 to a flow control valve 64. The flow control valve 64 is of conventional construction and is adjustable to permit a predetermined rate of flow of hydraulic fluid from the solenoid operated valve 58, through line 66 and to a conventional, pilot-operated directional control valve 67 which includes pilot operators 68 and 69.

The pilot-operated directional control valve 67 is selectively in one of two positions to permit a controlled flow of hydraulic fluid. When the directional control valve 67 is disposed in a first position as shown in FIG. 2, a stream of hydraulic fluid flows from line 66 to line 70, and a second, return stream flows from line 80 to the hydraulic reservoir 54. When the directional control valve 67 is disposed in the second position, not shown, a stream of hydraulic fluid can flow from line 70 to the hydraulic reservoir 54. The position of the directional control valve 67 in its first or second position is determined by application of control signals to the pilot operators 68 and 69 as discussed hereinafter.

A sequence valve 72 is connected to receive the flow of hydraulic fluid from line 70. The sequence valve 72 is of a conventional construction and includes a line 71 to carry hydraulic fluid which leaks therefrom to a collection container 73. The sequence valve 72 permits hydraulic fluid to flow from line 70, through line 27 and to hydraulic motor 26. The flow of hydraulic fluid through the hydraulic motor 26 causes it to rotate thereby driving sprocket 23.

Hydraulic fluid flows from the hydraulic motor 26 through line 28 to sequence valve 74, which is the same as sequence valve 72, described above and includes a line 75 to carry hydraulic fluid which leaks therefrom to a collection container 77. Hydraulic fluid flows from the sequence valve 74 through line 76 to flow control valve 78, which is the same as flow control valve 64, described above. Hydraulic fluid flowing from the directional control valve 67 and thereafter into the hydraulic fluid reservoir 54.

The sequence valve 72 is connected to the pilot operator 68 of the directional control valve via hydraulic line 82. In practice, the sequence valve 72 is adjustable so that if the pressure of the hydraulic fluid flowing through the valve 72 to line 27 is less than a predetermined value, no fluid flows through line 82, and when the pressure of the fluid in the valve 72 is equal to or greater than the predetermined value, the hydraulic fluid flows through line 82 to the pilot operator 68. When fluid does not flow through line 82, the directional control valve 67 is not affected by the sequence valve 72. However, when fluid flows through line 82 the directional control valve 67 is actuated to assume its second position, not shown.

Similarly, the sequence valve 74 is connected to the pilot operator 69 of the directional control valve 67 via line 84. When the pressure of the hydraulic fluid flowing through the valve 74 to line 76 is less than a predetermined value no fluid flows through line 84, and when the pressure is greater than or equal to the predetermined value, fluid flows through line 84 to the pilot operator 69. When fluid does not flow through line 84, the directional control valve is not affected by the sequence valve 74. When fluid flows through line 84, the directional control valve is actuated to assume its first position, shown in FIG. 2.

As noted, parts of the present device, identified above, are conventional. The table below lists conventional parts of the present device and corresponding manufacturers thereof, along with the manufacturer's model number. It should be understood that like parts made by other manufacturers could be also used.

| Part | Manufacturer | Model No. |
|---|---|---|
| Solenoid Valve 58 | Teledyne Republic | 962-A-¾-D2 |

| Part | Manufacturer | Model No. |
|---|---|---|
| Flow-Control Valve 78 | Manufacturing Teledyne Republic Manufacturing | M/H4111C-½ |
| Pilot-Operated Directional Control Valve 67 | Sperry Vickers | DG 1954-062-51 |
| Sequence Valve 74 | Sperry Vickers | RCT-03-DP2-23 |

In operation, while filtering of slurry is taking place the hydraulic pumping unit 52 is connected to line 34 to pump hydraulic fluid into the cylinder 32 to drive the follower away from the cylinder 32 and toward the head 15 of the press. When the follower 17 is driven toward the head 15 of the press, it contacts the filter plates to force them into abutting relationship with each other. While the filter press is being used to filter slurries, the plates are maintained in this position by continued operation of the hydraulic pumping unit 52 which maintains the pressure of hydraulic fluid in the hydraulic cylinder 32.

After slurry has been filtered through the media on the filter plates and it becomes necessary to clean the media, hydraulic fluid is pumped into the hydraulic cylinder 32 via line 33 to cause the follower 17 to move away from the filter plates. When the follower 17 has moved to a position adjacent the cylinder 32, as shown in FIG. 2, the follower 17 contacts the actuating arm 62 to close the limit switch 60. The piston 51 contacts the cylinder 32 and can move no further; however, the pumping unit 52 continues to operate. The limit switch 60, now closed, causes electric current to flow to the solenoid operated valve 58 causing the valve to open to permit hydraulic fluid to flow to the hydraulic motor 26 through line 27 to drive it to rotate in a clockwise direction.

It is understood that at this time the pawl 44 of the carriage 41 is raised so that the carriage 41 is coupled to the filter plate which is nearest to the follower 17. The clockwise rotation of the hydraulic motor 26 thereby drives the carriage 41 to transport the filter plate toward the follower at a controllable rate. The controllable rate can be preselected by adjusting the flow control valves 64 and 78. When the carriages 41 transport the filter plate into abutting relationship with the follower 17, the hydraulic motor stalls, and the pressure increases in the lines between the pumping unit 52 and the motor 26 and in the sequence valve 72. When the pressure has increased to a predetermined value, hydraulic fluid flows from the sequence valve through line 82 and to the pilot operator 68. Flow of hydraulic fluid through line 82 actuates the directional control valve 67 to its second position so that hydraulic fluid flowing from the pumping unit 52 through line 66 is diverted to line 80 and to the hydraulic motor 26 to cause it to rotate counter-clockwise. The hydraulic motor 26 thereby drives the carriages 41 away from the follower 17 and toward the filter plates at the head of the press. It should be understood that the pawl 46 is in its lowered position, and therefore, the carriages 41 have uncoupled from the filter plate located at the follower end of the press. Therefore, the plate is not carried back with the carriages 41.

Thereafter the carriages 41 contact a filter plate in the stack of filter plates at the head end of the filter press and couple to the filter plate. When the carriages have coupled to the filter plate, the carriages 41 can move no further to the left, and therefore, the hydraulic motor 26 again stalls. When the hydraulic motor 26 stalls, the pressure builds up in line 28 thereby actuating the directional control valve to again reverse the flow of hydraulic fluid through the hydraulic motor 26 to drive the carriages 41 to the right to carry the filter plate to the follower end of the press.

It is understood that the control system can be adjusted so that the filter plates are carried from the head end to the follower end of the press at a slow speed and the carriages 41 return from the follower end to the head end at a relatively high speed. Thus, as each filter plate is carried slowly from the head to the follower end of the press, filter cake which has accumulated on the plate can be removed by conventional means, and the carriages 41 return to the head end of the press at relatively high speed to pick up the next filter plate.

It should also be understood that the torque on the hydraulic motor 26 which actuates the sequence valves 72 and 74 to reverse the hydraulic motor 26, is also adjustable by adjustment of the sequence valves 72 and 74.

I claim:

1. An improved filter apparatus for separating liquid from a liquid-solid mixture to form filter cake including a frame, a stationary press head mounted at one end of the frame, a follower mounted on the frame for reciprocatable movement toward and away from the press head, a plurality of filter plates mounted for movement on said frame between the stationary press head and the follower, a carriage mounted for reciprocatable movement on the frame to selectively and sequentially couple to and uncouple from each of the filter plates beginning with the filter plate nearest the follower, a closing cylinder connected to the follower to reciprocate the follower between an open position spaced from the stationary press head and a closed position that is closer to the press head to hold the filter plates in abutting relation whereby filter cake can be formed in chambers between adjacent filter plates, and means operatively connected to said carriage for shifting a selected filter plate in an opening direction away from an adjacent filter so that the filter cake formed in the chamber between the shifted filter plate and the adjacent filter plate may be dumped therefrom and for thereafter shifting the carriage in a return direction to cause the carriage to engage another filter plate to be shifted, wherein the improvement comprises: said shifting means including drive chains connected to said carriage; a reversable hydraulic motor that is operatively connected to the chains; a hydraulic pump; a directional control valve coupled in fluid-flow communication between the pump and the motor for selectively causing the motor to drive the carriage in said opening and return directions; pressure-sensitive means responsive to the fluid pressure between the pump and the hydraulic motor for automatically reversing the hydraulic motor when the carriage shifts a filter plate to the end of its travel in said opening direction and to subsequently reverse the motor when the carriage engages the next filter plate to be shifted at the end of its travel in said return direction; an adjustable flow regulator valve installed in fluid-flow communication between the pump and the motor for regulating the speed at which the carriage is shifted in said opening direction, and another adjustable flow regulator valve installed in fluid-flow communication between the pump and motor for regulating the rate of speed at which said carriage means is moved in said return direction, said flow regulator valves being set to cause the carriage to be moved more rapidly in the return direction than it is shifted in the opening direction.

2. An improved filter apparatus for separating liquid from a liquid-solid mixture to form filter cake including a frame, a stationary press head mounted at one end of the frame, a follower mounted on the frame for movement toward and away from the press head, a plurality of filter plates mounted for movement on said frame between the stationary press head and follower, a carriage mounted for reciprocatable movement on the frame to selectively and sequentially couple to and uncouple from each of the filter plates beginning with the filter plate nearest the follower, a closing cylinder connected to the follower to reciprocate the follower between an open position spaced from the stationary press head and a closed position that is closer to the press head to hold the filter plates in abutting relation whereby filter cake can be formed in chambers between adjacent filter plates, and means operatively connected to said carriage for shifting a selected filter plate away from an adjacent filter so that the filter cake formed in the chamber between the shifted filter plate and the adjacent filter plate may be dumped therefrom and for thereafter returning said carriage to cause the carriage to engage another filter plate to be shifted, wherein the improvement comprises: said shifting means including drive chains connected to said carriage; a reversable hydraulic motor that is operatively connected to the chains; a hydraulic pump; a directional control valve coupled in fluid-flow communication between the pump and the motor for selectively causing the motor to drive the carriage in said opening and return directions; an adjustable pressure-sensitive means coupled in fluid-flow communication between the pump and the motor to sense the pressure transmitted to the motor when the motor drives the carriage in said opening direction; means for operatively connecting said pressure-sensitive means to said directional control valve to cause the control valve to reverse flow to the motor when the pressure-sensitive means senses a preselected fluid pressure; another adjustable pressure-sensitive means coupled in fluid-flow communication between the motor and the pump to sense the fluid pressure of the fluid transmitted to the motor when the carriage is driven in said return direction; means for operatively connecting said last-mentioned pressure-sensitive means to said directional control valve to cause the control valve to reverse the flow to said motor when the pressure-sensitive means senses a preselected pressure; and valve means installed in fluid-flow communication between said pump and said motor to regulate the speeds at which the carriage is shifted in said opening and return directions to cause the carriage to move in said return direction more rapidly than it is shifted in said opening direction.

* * * * *